United States Patent [19]
Knoll et al.

[11] Patent Number: 5,297,864
[45] Date of Patent: Mar. 29, 1994

[54] DEGASSING MEANS FOR A TWIN SCREW EXTRUDER FOR PLASTIC MATERIALS

[75] Inventors: Arno Knoll, Stuttgart; Wolfgang Woerz, Illingen, both of Fed. Rep. of Germany

[73] Assignee: Werner & Pfleiderer GmbH, Stuttgart, Fed. Rep. of Germany

[21] Appl. No.: 97,194

[22] Filed: Jul. 26, 1993

[30] Foreign Application Priority Data

Aug. 27, 1992 [DE] Fed. Rep. of Germany ....... 4228468

[51] Int. Cl.⁵ ...................... B29B 1/10; B01F 15/02; B01F 15/06
[52] U.S. Cl. ........................ 366/75; 366/85; 425/203; 425/204
[58] Field of Search ............ 366/76, 75, 77, 78, 366/79, 80, 83, 84, 85, 89, 90, 91, 97, 149, 144, 301; 425/203, 204, 812; 264/101, 102, 211.23

[56] References Cited

U.S. PATENT DOCUMENTS

| | | | |
|---|---|---|---|
| 3,985,348 | 10/1976 | Skidmore | 366/75 |
| 4,124,307 | 11/1978 | Anisic | 366/149 |
| 4,260,264 | 4/1981 | Maki | 366/75 |
| 4,902,455 | 2/1990 | Wobbe | 366/75 |
| 4,929,407 | 5/1990 | Giza | 425/203 |

Primary Examiner—Robert W. Jenkins
Attorney, Agent, or Firm—Ladas & Parry

[57] ABSTRACT

A twin screw extruder for processing plastic material having a housing provided with a plurality of juxtaposed housing segments arranged axially in succession and defining two longitudinal, overlapping bores respectively containing two coaxially arranged extruder screws, rotatable about respective longitudinal axes, and having intermeshing threads. One of the housing segments serves as a degassing housing segment for degassing the plastic material and it is connected to a degassing chamber. The degassing housing segment has a transverse, radial opening in which an insert member is fitted, the insert member having a degassing opening providing communication between the degassing chamber and the bores in the housing. The degassing opening tapers in widening fashion in the direction from the longitudinal bores to the degassing chamber, and the degassing opening has a longitudinal axis disposed in a plane passing through the longitudinal axes of the screws. The insert member can be mounted at either or both sides of the housing and a sealing insert member is inserted in the opening in the housing segment which is to be blocked. The degassing opening is rectangular in cross-section.

17 Claims, 4 Drawing Sheets

DEGASSING MEANS FOR A TWIN SCREW EXTRUDER FOR PLASTIC MATERIALS

FIELD OF THE INVENTION

The invention relates to a twin screw extruder for processing plastic material having a housing formed by a plurality of juxtaposed housing segments arranged axially in succession and defining two longitudinal overlapping bores respectively containing coaxially arranged extruder screws, rotatable about respective longitudinal axes and having intermeshing threads. At least one of the housing segments serves for degassing the plastic material and is in communication with a degassing chamber attached at a lateral side of the housing. The degassing housing segment has a transverse radial opening in which is fitted an insert member having a degassing opening providing communication between the degassing chamber and the bores in the housing.

BACKGROUND AND PRIOR ART

Kunststoffe 71 (1981), No. 1, pp. 18–26 discloses degassing devices in which an insert member is incorporated in the interior space of the extruder housing for degassing the plastic material in multi-screw extruders, the opening in the insert member providing communication between the interior of the housing and a degassing chamber for removing separated gas. The degassing chamber is arranged on the upper side of the housing and requires a special configuration, based on the rheological behavior of the plastic melt and/or the order of magnitude of the process parameters in the screw extruder. This arrangement has the undesirable result that separated melt as well as condensation products can reach the primary flow of melt being processed, which then becomes contaminated.

A degassing device for a single screw extruder is disclosed in Chemie. Ing. Technik 1962, No. 11, p. 751 in which the degassing device is arranged laterally downwards. This device is suitable only for masses of a certain low viscosity.

In another extruder disclosed in DE 37 03 758A1, the degassing opening is connected to a vacuum chamber in the region of the side wall of a cylindrical screw housing at an angle of inclination relative to a line normal to the axis of the housing, so that plastic melt discharged from the cylindrical screw housing is guided back into the plastic material being processed in the housing.

The known degassing devices have the disadvantage that they tend to introduce separated quantities of plastic or condensation products back into the main stream of the plastic melt, especially for high flow in the degassing channel. Particularly serious in the case when product residues entrained in the gas flow are baked in the degassing channel causing contamination of the melt product being processed due to decomposition of the residues because of the longterm temperature effect.

Where this is not the case, such as, for example, in screw housings having degassing openings directed laterally downwards, only plastics within narrow viscosity limits can be processed, so that extensive retooling of the screw extruder is necessary for the degassing of different polymer solutions or melts.

SUMMARY OF THE INVENTION

An object of the invention is to provide degassing means which is effective, in a simple way, to remove volatile components from melted plastic materials within a broad viscosity range thereof.

The above and further objects of the invention are achieved by the provision wherein the degassing opening in the insert member tapers in widening fashion in the direction from the longitudinal bores in the housing to the degassing chamber, said degassing opening having a longitudinal axis disposed in a plane passing through the longitudinal axes of the extruder screws.

The insert member is fitted tightly in a transverse opening provided in the particular housing segment to achieve a lateral discharge of volatile components from the interior of the extruder housing without reflux of the components into the main flow of plastic melt. The longitudinal bores in the housing extend horizontally, as does the lateral degassing opening in the insert member.

By forming the degassing opening with a widening taper symmetrically about the longitudinal axis of the degassing opening, the passage of volatile components in the degassing opening, without reflux, is promoted and additionally, the degassing device becomes adaptable for varied degassing functions without special modification of the existing housing segments. Thus, the insert member can be introduced as desired on either side of the housing of the screw extruder depending on the viscosity of the plastic melt to be processed in the extruder, without special modifications. For highly viscous products the plastic melt is transported upwardly against the force of gravity as it traverses the mouth of the inlet of the degassing opening, whereas for low viscous products and little adhesion, the plastic melt travels downwardly across the mouth of the inlet of the degassing opening.

The tapering degassing opening has a transverse cross-section which is elongated in the longitudinal direction of the extruder screws and preferably is of rectangular outline with its greater length dimension extending in the direction of the longitudinal axis of the extruder screws. This maximizes the degassing surface of the extruder screws in the degassing operation.

In a simplified arrangement which is easy to handle, the housing segment which is to receive the insert member has an opening of rectangular cross-section and the insert member includes a projection of corresponding rectangular cross-section which can be tightly fitted in the opening in the housing segment. The outer surface of the insert member is flush with the outer surface of the housing. Hence, a smooth unbroken outer contour of the housing is provided which enables application of heating shells onto the housing as in the conventional screw extruder.

In accordance with a feature of the invention, the inner surface of the projection of the insert member partially covers the circumference of the adjoining longitudinal screw and the inner surface is provided with a localized enlargement to form a gap or pocket with the circumference of the screw in a region where the circumference of the rotating screw travels upwards and away from the insert member. This prevents the melt product from passing into the degassing opening and promotes the surface adhesion of the melt product on the extruder screws.

In the case of intense degassing conditions and/or highly viscous melt products, it is advantageous to use multiple degassing stages. This can be achieved according to the invention, by providing a second transverse opening in the degassing housing segment arranged relative to the first opening symmetrically with respect to a vertical longitudinal plane midway between the longitudinal axes of the extruder screws, and installing a second insert member in the second opening having a degassing opening connected to an associated degassing chamber, said degassing opening having a longitudinal axis coincident with the longitudinal axis of the degassing opening in the first insert member on the other side of the degassing segment. Hence, the melt product is subjected to degassing in the degassing openings successively with reference to the rotational direction of the degassing screws.

If only one degassing opening is to be utilized on either side of the housing, a sealing insert member is inserted into the radial opening at the other side to close the same.

DETAILED DESCRIPTION OF PREFERRED EMBODIMENTS OF THE INVENTION

Figure 1:
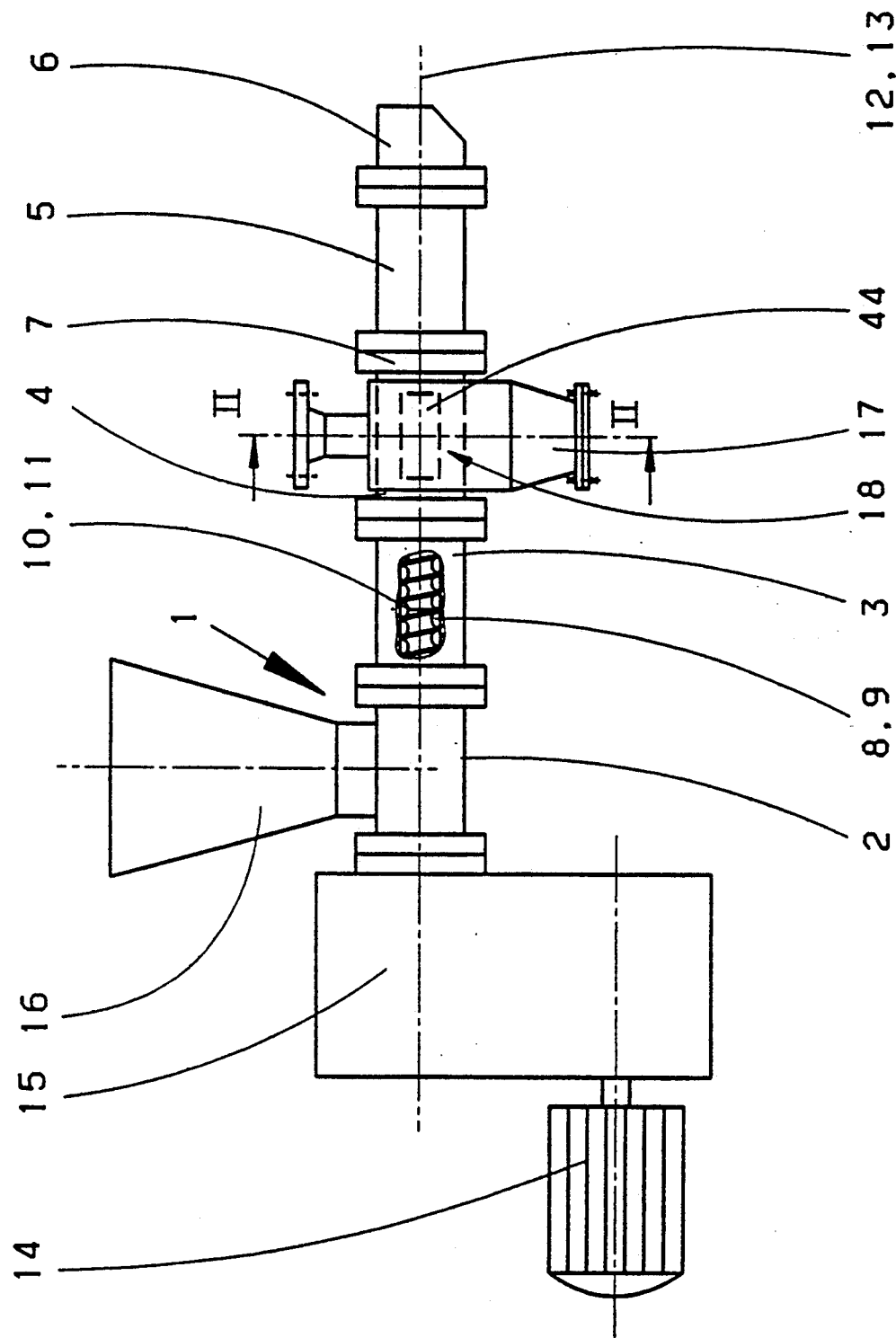
FIG. 1 is a diagrammatic longitudinal elevation view, partly broken away, of a melt extruder with degassing means according to the invention.

In the drawing there is illustrated a twin screw extruder having a housing 1 formed by a number of successive, juxtaposed, housing segments 2, 3, 4, 5 and a discharge nozzle 6. The sections 2-5 are respectively provided with flanges 7 at their opposite ends and the sections are joined together in axial alignment by mating the flanges in mouth to mouth relation. The housing 1 is provided with two, parallel, longitudinal bores 8, 9 which overlap one another and extruder screws 10, 11 are coaxially mounted respectively in the bores 8, 9 for rotation around respective axes 12, 13 in the direction of the arrows in FIG. 2. The extruder screws 10, 11 have intermeshing threads for mixing and advancing plastic melt in the housing. The extruder screws 10, 11 are driven in rotation by motor 14 through transmission 15.

The first housing segment 2 has an inlet hopper 16 for receiving the plastic product to be processed. The product is transported in housing segments 2 and 3 and where it is heated and compressed and the plastic melt is then introduced into housing segment 4, to undergo a degassing treatment. The plastic melt is also decompressed in housing segment 4. In housing segment 5, the melt product is once again compressed and subsequently discharged from discharge nozzle 6.

Figure 2:
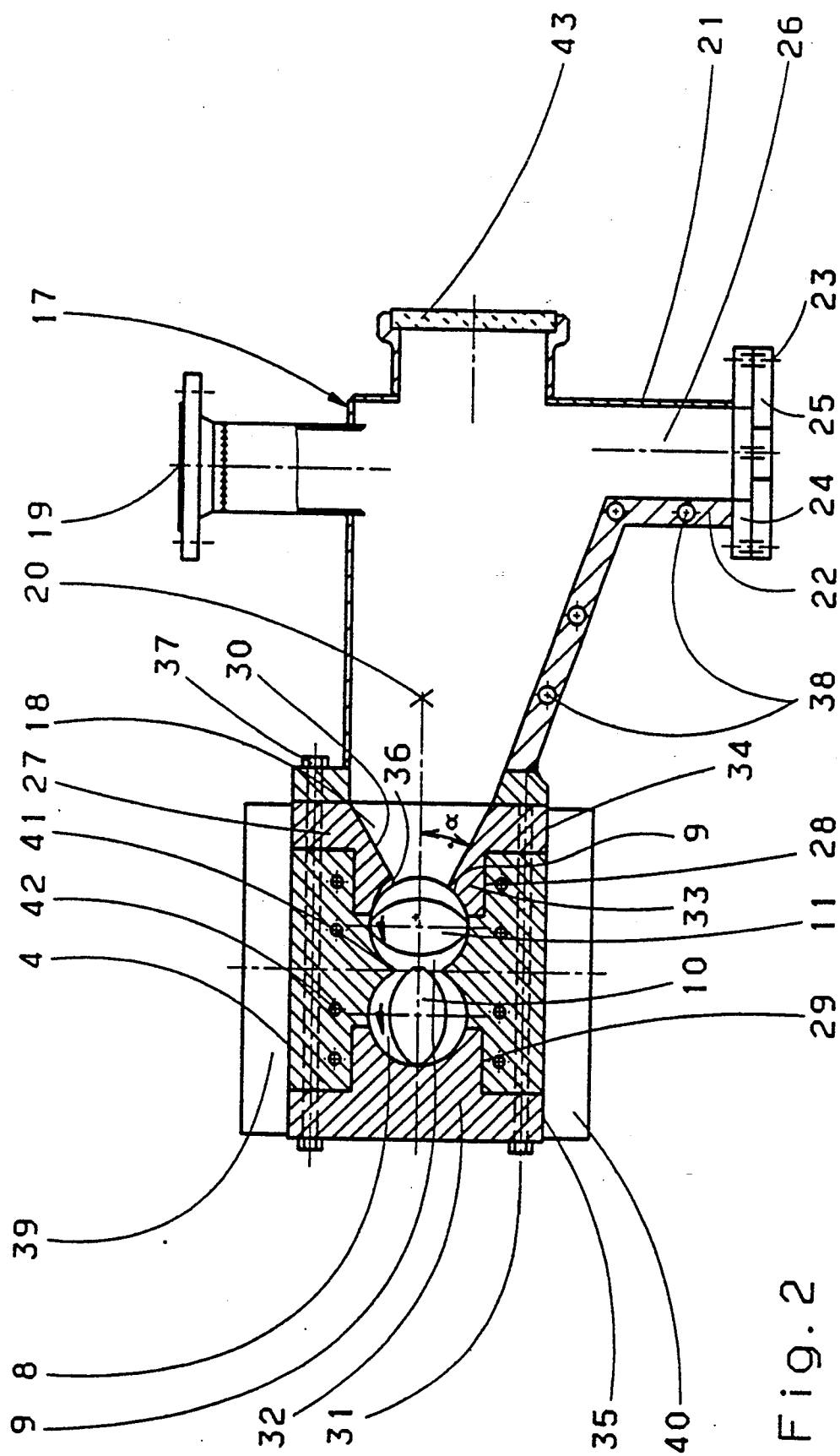
FIG. 2 is a sectional view taken along line II—II in FIG. 1 showing a first embodiment of the degassing means according to the invention.

Referring to FIG. 2, therein is shown a degassing chamber 17 sealingly mounted on housing segment 4 by means of a flange on chamber 17 which is connected by bolts 37 to the housing segment 4. The degassing chamber 17 extends laterally at the right side of the housing segment 4 as shown in FIG. 2. More particularly, the flange of chamber 17 is secured to an insert member 27 in the housing segment 4. The insert member 27 is provided with a degassing opening 18 which provides communication between longitudinal bore 9 and the interior of the degassing chamber 17. The degassing opening 18 has a longitudinal axis 20 which extends horizontally in a plane passing through longitudinal axes 12, 13. The degassing chamber 17 has a suction outlet 19 for removal of gases from chamber 17.

Degassing chamber 17 comprises two shells 21, 22, a bottom plate 24 attached by bolts 23 to the lower end of shells 21, 22 and a cover 25. In order to view the interior space 26 in degassing chamber 17, a transparent inspection window 43 is provided. To avoid deposition of plastic material in the degassing chamber, shell 22 is intensively heated by heating rods 38 placed in shell 22 from the housing 1 to the region of bottom plate 24. Heating jackets (not shown) can be externally placed on shell 22 for supplying additional heat thereto. Any plastic which collects in the interior space 26 of degassing chamber 17 can be easily removed by removing cover 25 attached to bottom plate 24 to prevent contamination with the plastic being treated in the housing 1. The insert member 27 which is sealingly connected in airtight manner with degassing chamber 17 by the flange-type arrangement is form-fitted in housing segment 4 in a rectangular opening 28 therein. A similar opening 29 is symmetrically placed on the other side of housing segment 4 in a mirror image relation to opening 28 and receives a insert member 32 which seals opening 29. The insert member 32 is secured in opening 29 by bolts 31 attached to housing segment 4.

The degassing opening 18 is formed by a tapered bore 30 in insert member 27. The bore 30 widens in a transverse direction from the longitudinal bore 13 to the interior space 26 of degassing chamber 18. The bore 30 is symmetrical around axis 20 of the degassing opening 18.

The tapered bore 30 has an angle of taper of at least 10 degrees with respect to its longitudinal axis 20. The interior space 26 of degassing chamber 17 is also formed with a tapered section which widens from the outlet of the bore 30 and the angle of taper is also at least 10°.

The bore 30 is preferably of rectangular section as shown in FIG. 1 to provide a relatively large surface area of the degassing opening 18 to expose a maximum length of the adjacent longitudinal screw 11. Hence, the bore 30 has the shape of a frustum of a pyramid.

Insert members 27 and 32 have end portions 33 of rectangular cross-section corresponding to openings 28 and 29 whose dimensioning makes possible the formation of bores 8 and 9 in these insert members 27, 28 such that a sufficient covering of screws 10, 11 is still provided at the degassing opening 18. The end portions 33 have a diameter of 1.2-1.4 times the diameter of screws 10, 11 and still leaves an adequate distance to the respective longitudinal axes 12, 13 of screws 10, 11. The smaller end of opening 30 becomes aligned with bore 8 and leaves free a sufficient surface of screw 11 for degassing. The outer surfaces of flanges 34 and 35 of insert members 27 and 32, correspond to the outer contour of housing segment 4, so that after the insert members are installed in housing segment 4 they form a smooth, continuous, outer surface therefor of rectangular cross-section. In this way, housing segments 2, 3, 4 and 5 can be furnished with the same heating jackets 39, 40. Heating jackets 39, 40. Heating jackets 39, 40 also make possible a direct temperature control of the insert members 27 and 32. An intensive temperature control is possible in a wedge region 41 of the housing, which is difficult to thermally control, by means of an additional temperature-control bore 42 in housing segment 4 for passage of a heating fluid.

The inner surface of insert member 27 covering the surface of screw 11 in bore 9 has an enlargement or pocket 36 forming a gap with the surface of the screw, the pocket 36 being located above the axis 13 of screw 11 to face the surface of the screw which is travelling upwardly towards the pocket 36. In this way, input of material into the degassing opening 18 is opposed and material wastage is effectively prevented.

The symmetrical mirror-image arrangement and configuration of the attachment portions of the insert members 27 and 32 make it possible, in a simple way, to exchange these insert members such that product degassing can be obtained on the extruder either at the left or right side. Thus, a degassing of plastics, in which the plastic melt is advanced upwardly past the degassing opening 18 by screw 11, as shown in FIG. 2 is particularly advantageous, if the melt is present in a highly viscous phase in which the viscosity >2.5 Pa. In this way, the plastic melt is first brought upward against the force of gravity for good adhesion in the form of a thin film on the screw surface in the region of degassing opening 18. Several degassing openings 18 can be arranged next to each other in the longitudinal direction of housing 1 in successive degassing segments.

Figure 3:
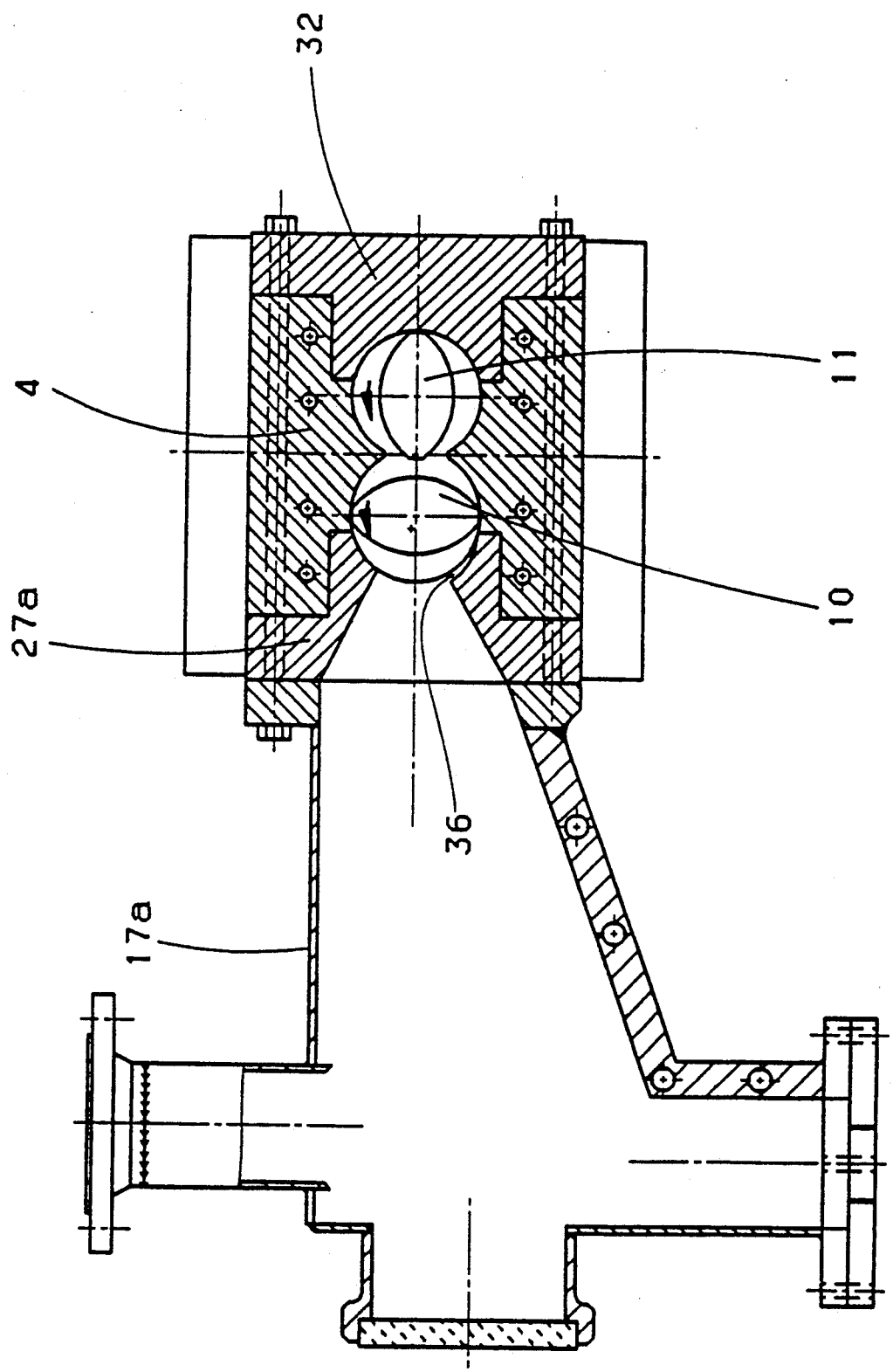
FIG. 3 is similar to FIG. 2 showing a modified embodiment of the degassing means according to the invention.

An arrangement of the degassing opening 18 at the other side of the housing, i.e. at an offset of 180 degrees is shown in FIG. 3. This arrangement is advantageous, if low-viscosity products with a small adhesion capacity are processed by the screws. Degassing chamber 17a is joined to the housing in the same way as in FIG. 2 with insert member 27a. The pocket 36 of insert member 27a lies below longitudinal axes 12, 13 of screws 10, 11 and faces the surface of the screw travelling downwards towards the pocket.

Thus, in both cases it is easy to change the configuration of the extruder by detaching flange 34 of insert member 27 (together with degassing chamber 17) from housing segment 4, and installing it on the opposite side as shown in FIG. 3. Here also, the sealing insert member 32 is installed in a mirror-image arrangement relative to insert member 27a.

This advantage of a simple reconfiguration capability is also possible for different insert members 27 having different pockets 36 shaped according to the product to be processed.

Figure 4:
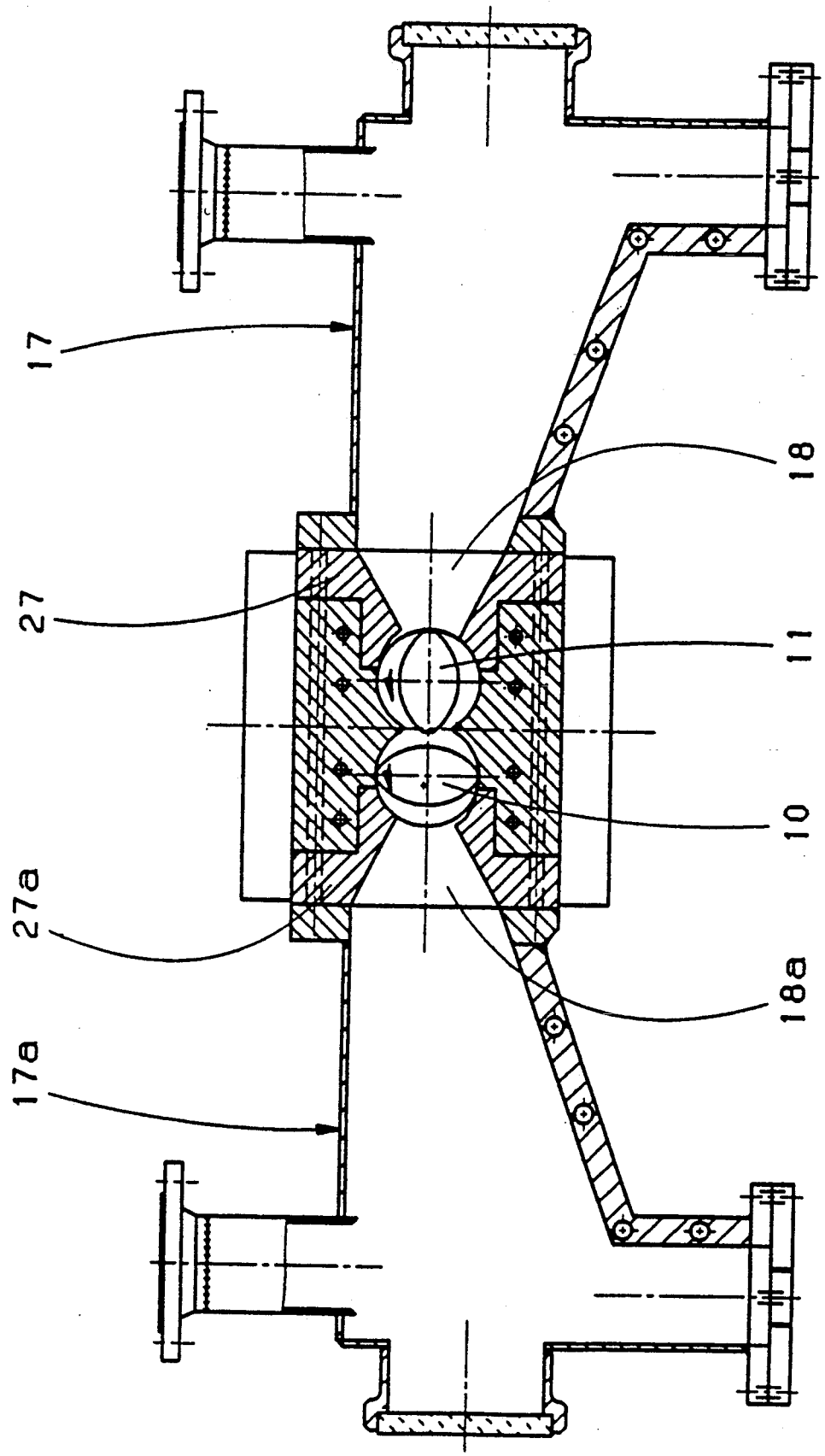
FIG. 4 is a view similar to FIGS. 2 and 3 showing a further modified embodiment of the degassing means according to the invention.

Further, an opposed arrangement of two degassing chambers 17, 17a is possible, as shown in FIG. 4, for intense degassing of melt products whose viscosity lies above 2.5 Pa.

Here, opposed insert members 27, 27a with degassing openings 18, 18a are assembled in a mirror-image relation relative to a central axis between the two longitudinal axes 12, 13 of screws 10, 11. The attachment of insert members 27, 27a corresponds to that shown in FIGS. 2 and 3.

This arrangement can be reformed at any time, according to the invention, by removal of degassing chamber 17 or 17a and replacing it with sealing insert member 32 to obtain the single-form of degassing according to FIG. 2 or FIG. 3.

Instead of installing the sealing insert member 32 in opening 18, a part with a connection for introducing fillers and reinforcing materials into the melt extruder can be installed. In all of these cases, the advantageous exchangeability of insert members 27 or 32 makes the degassing apparatus very useful without requiring special retooling of the extruder.

While the invention has been disclosed in relation to specific embodiments thereof it will become apparent to those skilled in the art that numerous modifications and variations can be made without departing from the scope and spirit of the invention as defined in the attached claims.

What is claimed is:

1. In a twin screw extruder for processing plastic material having a housing provided with a plurality of juxtaposed housing segments arranged axially in succession and defining two longitudinal, overlapping bores respectively containing two coaxially arranged extruder screws, rotatable about respective longitudinal axes, and having intermeshing threads, one of said housing segments serving for degassing the plastic material and communicating with a degassing chamber, said one housing segment having a transverse, radial opening in which an insert member is fitted, said insert member having a degassing opening providing communication between the degassing chamber and the bores in said housing, the improvement wherein said degassing opening in said insert member tapers in widening fashion in the direction from said longitudinal bores to said degassing chamber, said degassing opening having a longitudinal axis disposed in a plane passing through the longitudinal axes of said screws.

2. The improvement as claimed in claim 1, wherein said degassing opening has an angle of taper of at least 10°.

3. The improvement as claimed in claim 1, wherein said degassing opening is rectangular with its greater length dimension extending in the direction of the longitudinal axes of the screws.

4. The improvement as claimed in claim 1, wherein said one housing segment has a transverse opening of rectangular section and said insert member includes a projection of rectangular section fitted tightly in said transverse opening, said projection having an inner surface facing a respective one of said extruder screws which partially covers the circumference thereof and means for detachably connecting the insert member to said one housing segment, said insert member having an outer surface which fits flush with the outer surface of the housing formed by the housing segments.

5. The improvement as claimed in claim 4, wherein said inner surface of said projection of said insert member includes a portion shaped to form a gap with the circumference of the longitudinal screw that it partially covers, said portion of said inner surface which forms said gap being located on said projection in a region where the circumference of said screw is travelling upwardly.

6. The improvement as claimed in claim 4, wherein said housing segment is provided with a second transverse radial opening arranged relative to the first said opening, symmetrical with respect to a vertical longitudinal plane midway between said longitudinal axes of said screws, a second insert member being fitted in said second opening in said one housing segment and having a degassing opening with a longitudinal axis coincident with the longitudinal axis of the degassing opening in the first said insert member.

7. The improvement as claimed in claim 6, wherein said first and second insert members are selectively detachable from said one housing segment and the improvement further comprises a sealing insert member selectively engageable in one of the transverse radial openings to close said opening, said sealing insert member having an outer surface which is the same as the outer surfaces of the first and second insert members.

8. The improvement as claimed in claim 6, comprising heating shells on said housing in heat exchange relation with said insert members.

9. The improvement as claimed in claim 8, wherein said heating shells are centered relative to said vertical longitudinal plane.

10. The improvement as claimed in claim 3, wherein said degassing chamber extends laterally at one side of said housing and has an interior space communicating with said degassing opening, means being provided for detachable connection of said degassing chamber and said insert member.

11. The improvement as claimed in claim 10, wherein said degassing chamber has a lower surface bounding said interior space thereof, said lower surface having an angle of taper similar to that of said degassing opening in said insert member.

12. The improvement as claimed in claim 11, comprising means for heating said lower surface of the degassing chamber.

13. The improvement as claimed in claim 12, wherein said degassing chamber has a downwardly facing discharge outlet.

14. The improvement as claimed in claim 1, wherein said housing segments have outer surfaces defining a rectangular cross-section for said housing of the screw extruder.

15. The improvement as claimed in claim 1, wherein said one housing segment has a vertical side wall with said transverse, radial opening formed therein, said insert member including a projection fitted in said opening in said one housing segment and a flange around said projection detachably connected to said side wall of said one housing segment.

16. The improvement as claimed in claim 15, wherein said projection has a rectangular cross-section.

17. The improvement as claimed in claim 16, wherein said housing segments have outer surfaces defining a rectangular cross-section for said housing of the screw extruder, said insert member having an outer surface of rectangular outline which is flush with the outer surface of the housing.

* * * * *